(12) United States Patent
Lefebvre

(10) Patent No.: US 6,419,969 B2
(45) Date of Patent: Jul. 16, 2002

(54) METHOD FOR MANUFACTURING CONFECTIONERY BARS

(75) Inventor: René Lefebvre, Arc sur Tille (FR)

(73) Assignee: Nestec SA, Vevey (CH)

(*) Notice: Subject to any disclaimer, the term of this patent is extended or adjusted under 35 U.S.C. 154(b) by 17 days.

(21) Appl. No.: 09/760,848

(22) Filed: Jan. 17, 2001

(30) Foreign Application Priority Data

Jan. 18, 2000 (EP) .............................. 00200182

(51) Int. Cl.[7] .............................. A23G 3/00; A23G 3/20
(52) U.S. Cl. .................... 426/289; 426/659; 426/660; 426/512; 426/517; 426/518; 118/13; 118/15; 118/24; 118/40; 425/363
(58) Field of Search ................... 426/517, 518, 426/512, 660, 659, 502, 503, 89, 93, 94, 496, 289; 226/200; 118/13, 15, 24, 40; 425/363

(56) References Cited

U.S. PATENT DOCUMENTS

| | | | | |
|---|---|---|---|---|
| 2,198,726 A | * | 4/1940 | Shwom et al. | |
| 2,439,899 A | * | 4/1948 | Monaco | |
| 2,696,793 A | * | 12/1954 | Oakes | |
| 4,159,348 A | | 6/1979 | Dogliotti | 426/23 |
| 4,368,684 A | * | 1/1983 | Launay | 118/25 |
| 4,454,834 A | | 6/1984 | Haas, Sr. et al. | 118/676 |
| 4,473,344 A | | 9/1984 | Sollich | 425/130 |
| 4,518,617 A | | 5/1985 | Haas, Sr. et al. | 426/231 |
| 4,587,128 A | * | 5/1986 | Cummings | 118/24 |
| 4,741,916 A | * | 5/1988 | Heidel et al. | 425/296 |
| 4,797,291 A | | 1/1989 | Pierce et al. | 426/63 |
| 4,992,285 A | * | 2/1991 | Larsen | 426/275 |
| 5,112,631 A | * | 5/1992 | Nakamura | 426/297 |
| 5,514,397 A | * | 5/1996 | Shapiro | 426/249 |
| 5,870,947 A | | 2/1999 | Harada | 99/450.2 |
| 5,951,766 A | * | 9/1999 | Miller | 118/13 |
| 6,001,403 A | * | 12/1999 | Kobayashi | 425/335 |
| 6,004,612 A | * | 12/1999 | Andreski et al. | 426/450 |
| 6,200,611 B1 | * | 3/2001 | Ganesan et al. | 425/308 |
| 6,242,028 B1 | * | 6/2001 | Bean | 425/259 |
| 6,350,483 B1 | * | 2/2002 | Ahad et al. | 426/249 |

FOREIGN PATENT DOCUMENTS

| | | |
|---|---|---|
| DE | 3532071 | 9/1985 |
| EP | 0 304 570 A2 | 6/1988 |

* cited by examiner

Primary Examiner—Carolyn Paden
(74) Attorney, Agent, or Firm—Winston & Strawn

(57) ABSTRACT

A method and device for manufacturing confectionery bars in the form of a three dimensional core at least partially covered with at least one layer of boiled sugar confectionery material. The method involves dimensioning at least one continuous band of boiled sugar confectionery material on a roller, cooling the band of boiled confectionery material, detaching the band from the roller, depositing the band on a core by bringing the band substantially into contact with the core on a plane that is adjacent to the most elevated surface or point of the core, and allowing the band to bend under its own weight to cover the sides of the core. The band is deposited in a viscoplastic state such that the band is capable of bending under its own weight.

18 Claims, 6 Drawing Sheets

METHOD FOR MANUFACTURING CONFECTIONERY BARS

FIELD OF THE INVENTION

The invention relates to the field of manufacturing confectionery bars. In particular the invention relates to manufacturing bars of a solid three dimensional confectionery core that is at least partially coated with boiled sugar.

BACKGROUND OF THE INVENTION

Confectionery bars based on boiled sugar that have a core of a waffle, biscuit, or ice cream, for example, are becoming increasingly popular. The boiled sugar gives the product masticability which is highly desirable because it blends well in the mouth with the rest of the product. A core coated on several sides with boiled sugar provides better homogeneity in the mouth than a structure that is made of superposed layers, such as, for example, a simple laminate of the caramel/waffle type. Therefore it is desirable to manufacture confectionery bars that are composite products formed from a solid three dimensional core that is coated, at least partially, with a boiled sugar layer. Preferably, the boiled sugar layer is further coated with an external chocolate layer.

Traditional methods for manufacturing such confectionery bars involved continuously conveying separate portions of the core that is to be coated under a curtain of liquid boiled sugar so that the core is coated on several of its sides. The temperature necessary to reach a sufficient degree of fluidity for the coating, such as with a boiled sugar of the caramel type, is on the order of 60° C. or higher. A major disadvantage of coating under a curtain is the difficulty in controlling the thickness of the coating on the vertical sides of the core. In particular, because of the high fluidity of the coating when the core is passed through the curtain of coating, the boiled sugar does not harden immediately and therefore tends to run down the vertical sides of the core, resulting in the formation of an undesirable gradient of coating thickness. Thus, the quality of the product and the reproducibility of the product are compromised. Another disadvantage is related to the large mass of liquid coating that must be used in order to properly coat the core. The large amount of liquid means that a relatively large proportion of the liquid needs to be recovered. Thus, it is necessary to provide a system for recovering and reprocessing the mass of boiled sugar coating. This can be difficult considering that this mass of liquid coating tends to harden rapidly on contact with the components of the recovery plant. Furthermore, in some cases, it is necessary to provide a cooling system, for example, a cooling tunnel, to accelerate cooling of the coating, to reduce the gradient effect, and limit the "loss" of coating material.

U.S. Pat. No. 4,518,617 relates to manufacturing blocks of wafers formed from superposed layers of wafers with intermediate layers of cream disposed between the layers of wafers. The process relates to the production of products having a "sandwich" configuration based on successively deposited layers of cream and is unrelated to covering a confectionery base with a layer of boiled sugar on several of its sides.

European Patent Application 0,304,570 relates to a process for manufacturing a confectionery mass on a roller, sprinkling solid components on the mass before it cools, and depositing the mass on to a conveyor belt.

U.S. Pat. No. 4,454,834 relates to a method of coating wafer sheets and the like by spreading a solidifying confectionery mass over the wafer sheets so as to form products having a "sandwich" structure.

There remains a need for methods of manufacturing confectionery bars coated with boiled sugar that overcomes the above-mentioned disadvantages of the traditional processes and, in particular, a method that eliminates the problem of the coating forming a gradient of uneven thickness when a three dimensional core is coated.

SUMMARY OF THE INVENTION

The invention relates to a method for manufacturing coated confectionery bars in the form of a three dimensional core which is at least partially coated with at least one layer of a boiled sugar confectionery material. The method involves providing a heated, continuous band of a boiled sugar confectionery material at a depositing temperature sufficient to enable the band to bend under its own weight, the band having a thickness, a width, and first and second surfaces; and depositing the band on one or more three dimensional cores each having a length, a width, at least two sides, and a top surface or point, with the band being deposited in a plane that is adjacent to and in contact with the surface or point of the one or more cores so that the band bends under its own weight to at least partially cover the top surface or point and at least one side of the one or more cores to provide at least one three dimensional coated confectionery bar. The three dimensional core may be in the shape of a square, rectangular, triangular, trapezoid, or hemispherical section and the band of boiled sugar confectionery material may have a viscosity of about 4,000 poise to 10,000 poise at a shearing rate of about 2 to 8 seconds$^{-1}$ when being deposited. The boiled sugar confectionery material may be one or more of caramel, chewy paste, marshmallow, or nougat and the core may be a wafer, a biscuit, ice cream, or a hardened boiled sugar base.

The first surface may have a temperature that is greater than that of the second surface to provide greater stickiness for the first surface and the band may be deposited with the first surface directly contacting the core(s). The method may further include providing inclusions on the first surface of the band and then depositing the band with the second surface directly contacting the core(s). The inclusions may be cereals, nuts, dried fruit, or mixtures thereof. The method may further involve cutting the three dimensional coated confectionery bar followed by at least partially coating the cut bar with chocolate.

The method may further involve providing a plurality of bands and a plurality of cores, each core having a length, a width, at least two sides, and a top surface or point, wherein each band bends under its own weight without a substantial change in the thickness or width of the band to at least partially cover the top surface or point and at least one side of each of the cores in order to provide a plurality of three dimensional coated confectionery bars. Each band may have a thickness of from about 3.5 to 4 mm, the bands may be spaced laterally, and the plurality of cores may be oriented laterally and end to end lengthwise. The method may include supporting each band before depositing them upon the cores. Each band may be formed on the support by first heating a boiled sugar confectionery material to a first temperature that is greater than that of the depositing temperature and then passing the heated confectionery material onto the support for cooling to the depositing temperature prior to depositing the bands upon the cores. The depositing temperature may be about 50° C. to 60° C. less than the first temperature, with the first temperature being between about 75° C. and 95° C. and the depositing temperature being between about 25° C. and 40° C.

One embodiment for manufacturing coated confectionery bars in the form of a three dimensional cores which are at least partly coated with at least one layer of a boiled sugar confectionery material involves providing a plurality of heated, continuous bands of boiled sugar confectionery material at a first temperature, wherein the bands have a thickness, a width, and inner and outer surfaces; cooling the bands to a second temperature by placing them on a roller having a cylindrical surface rotating at a first speed, with the inner surface of each band being in direct contact with the cylindrical surface of the roller, and the outer surface of each band not in direct contact with the cylindrical surface of the roller, with the second temperature being sufficient to allow the cooled bands to be detached from the surface of the roller and bend under their own weight; detaching the cooled bands from the cylindrical surface of the roller; and depositing each band on one or more three dimensional cores which pass by the roller on a conveyor at a second speed, wherein each core has a length, a width, at least two sides and a top surface or point that is most distant from the conveyor, wherein the bands are deposited in a plane that is adjacent to the top surface or point of the cores so that each band contacts the top surface or point of the cores and bends under their own weight to at least partially cover the top surface or point and at least one side of the cores to provide the three dimensional coated bars.

Each band may be formed on the roller by first heating a boiled sugar confectionery material to the first temperature and then passing the heated confectionery material onto the roller, wherein the bands are cooled by cooling the cylindrical surface of the roller to a temperature of about 18° C. to 22° C. Each band may have a thickness of from about 3.5 to 4 mm, the bands may be spaced laterally on the roller, and the plurality of cores may be orientied laterally and end to end lengthwise on a conveyor that passes beneath the roller, with the first speed and the second speed being substantially the same.

The plurality of cores may be arranged parallel to each other on the conveyor and the plurality of bands parallel to each other on the roller, wherein each band has a midline running lengthwise along the band and bisecting the width of the band and the midline of each band is separated by a distance, wherein the cores are obtained by cutting a sheet into a plurality of cores with the core width, wherein each core has a midline running lengthwise along the core and bisecting the core width, and laterally separating the cores with a separator so that the distance between the midline of the cores is substantially the same as the distance between the midline of the bands.

The method may also involve depositing inclusions onto the outer surface of each band after each band is formed on the cylindrical surface of the roller and before the band is detached from the cylindrical surface of the roller, with the inner surface of each band being deposited onto the core(s).

In one embodiment the method further involves providing a second plurality of heated, continuous bands of a second boiled sugar confectionery material at a third temperature, wherein the bands have a thickness, a width, and inner and outer surfaces; cooling the second bands to a fourth temperature by placing them on a second roller having a cylindrical surface rotating at a second speed, with the inner surface of each band being in direct contact with the cylindrical surface of the second roller, and the outer surface of each band not in direct contact with the cylindrical surface of the second roller, with the fourth temperature being sufficient to allow the second cooled bands to be detached from the surface of the second roller and bend under their own weight; detaching the second cooled bands from the cylindrical surface of the second roller; and depositing each second band on the three dimensional coated bars which pass by the second roller on the conveyor at the second speed, wherein the bands are deposited in a plane that is adjacent to the top surface or point of the coated bars so that each band contacts the top surface or point of the coated bars and bends under their own weight to at least partially cover the top surface or point and at least one side of the coated bars.

The invention also relates to a device for manufacturing coated bars in the form of a three dimensional core at least partly coated with at least one layer of a boiled sugar confectionery material. The device includes a reservoir for containing a boiled sugar confectionery material, wherein the reservoir has an outlet for depositing one or more bands of boiled sugar confectionery material on a rotating roller; a rotating roller having a cylindrical surface positioned under the outlet of the reservoir for receiving from the reservoir and cooling the one or more bands of boiled sugar confectionery material; a scraper arranged tangentially to the surface of the roller for removing the one or more cooled bands of boiled sugar confectionery material from the roller; and a conveying means positioned under the roller for supplying a core to be coated with the boiled sugar confectionery material when it is removed from the roller.

The roller may be maintained at a temperature of about 18° C. to 22° C., have a diameter of about 80 cm to 2 m, and be rotated at a speed of about 4 to 7 inches per minute. The reservoir may be heated to maintain the boiled sugar confectionery material at a temperature of about 85° C. to 95° C. The outlet in the reservoir and the scraper may be arranged such that, after the one or more bands are deposited on the roller, the one or more bands travel through an angular range of about 180 to 270 degrees before they are removed from the roller by the scraper. The outlet of the reservoir may be positioned about 4 to 15 cm above the roller. The device may also include a hopper for depositing inclusions on the band, wherein the hopper is positioned between the outlet of the reservoir and the scraper.

BRIEF DESCRIPTION OF THE DRAWINGS

The abovementioned characteristics and advantages as well as others of the invention will emerge from the detailed description and the drawings given by way of non-limiting examples and in which.

DETAILED DESCRIPTION OF THE PREFERRED EMBODIMENTS

Figure 1:
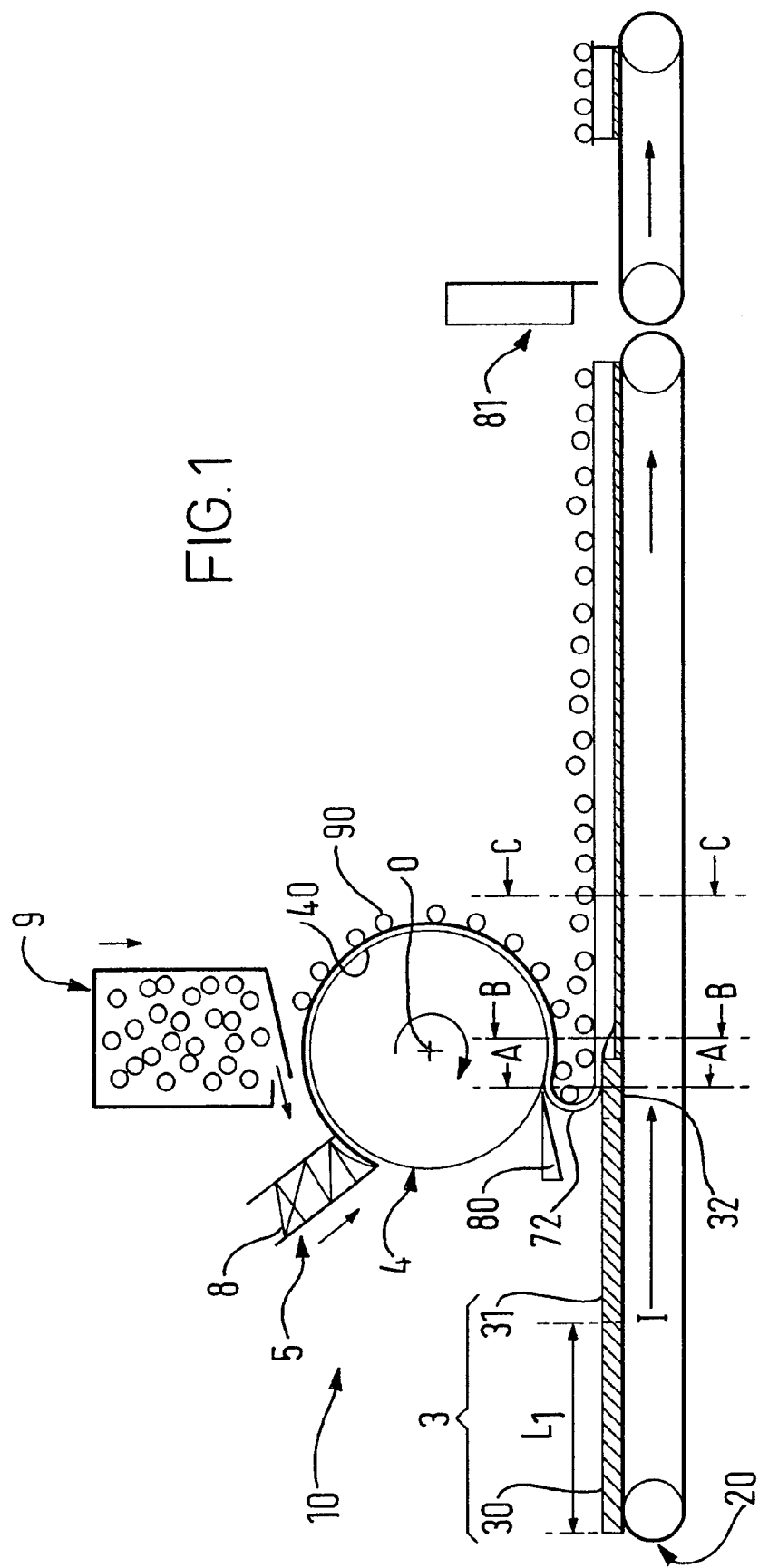
FIG. 1 depicts a side view of a device employing the method of the invention.

The present invention relates to a method for manufacturing individual confectionery bars comprising a three dimensional core and a layer of confectionery material, based on boiled sugar, that coats at least part of the core. The present invention is not directed to forming "sandwich" structures. Rather the present invention is directed to products that are coated on several sides. Typically, these products are obtained by the technique of conveying a confectionery core under a curtain of liquid boiled sugar. The method of the invention, however, avoids the disadvantages of the conventional process and, in particular, avoids the problem that the coating forms a gradient of uneven thickness on the core.

The method most preferably comprises dimensioning at least one continuous band of confectionery material based on boiled sugar, in the hot state, on a roller. The boiled sugar confectionery material is then cooled on the roller and the band detached from the roller. The detached band is then deposited on a core that is being continuously passed on a conveying means positioned beneath the roller. The detached band is deposited on a core by bringing the detached band into a depositing plane that is substantially adjacent to the point or surface of the core that is most elevated from the conveying means. According to an important aspect of the invention, the band, at the time it is deposited on the core, is in a viscoplastic state that allows it to bend or deform under its own weight so that, if the band is wider than the width of the core, the band, when it is deposited on the most elevated surface or point of the core, can bend to at least partially cover the sides of the core. The product is then cut into portions of desired length.

The term "viscoelastic," as used herein, means a material that is flexible and will bend or deform under its own weight so that the shape can change but is resistant to flow so that the dimensions, i.e., width, thickness, and length, do not change.

The method of the invention has the advantage of allowing a core to be coated or covered with a confectionery material without encountering the disadvantages related to the traditional processes for coating a core under a curtain. In particular, the method of the invention allows a coating to be deposited with a reduced gradient, or even no gradient, in the thickness of coating on the sides of the core. Moreover, the method of the invention results in only minimal loss of boiled sugar material. The method of the invention provides better control of the dimensions of the product. Moreover, not only is the quality and reproducibility of the product improved, but it is easier to make modifications in the design, structure, and characteristics of the product according to particular needs, such as, for example, adapting the product to different tastes or different markets.

Preferably, the deformation of the band occurs by bending the free portions over the core without significantly modifying the initial dimensions of the band. The initial dimensions of the band being defined when the band of boiled sugar is applied to the roller. The phrase "free portions," as used herein, should be understood to mean the portions of the band that are not in contact with the most elevated surface or point of the core at the time the coating is deposited on the base. Surprisingly, it is possible to use the viscoplastic deformation properties of the confectionery coating of the deposited band to at least partially coat the core. According to the method of the invention the band to simply allowed to bend under its own weight. Surprisingly, this occurs without significantly affecting the thickness or the width of the initially formed band. An insignificant dimensional modification is understood to mean an extension of less than about 10%, more preferably less than about 5%, relative to the initial dimensions as defined at the time the band is dimensioned on the roller.

According to a preferred embodiment of the invention, the band of confectionery material is formed by applying the boiled sugar material on the roller while it is hot. The initial temperature of the confectionery material is the temperature necessary to allow the band to be dimensioned in thickness and in width by passing the boiled sugar material through an opening having dimensions that correspond to the desired dimensions of the band and depositing the band on the roller. Dimensioning the band is an important stage during which the band is formed into the dimensions and shape that will correspond to the shape of the confectionery layer once it is in a folded or coated on the base.

In order to control the physical characteristics of the band, in particular its viscoplastic state at the time of deposition on the core, it is necessary to cool the band to solidify it sufficiently until it is detached from the roller. The roller is used to cool the band of boiled sugar material before it is detached from the roller. According to one embodiment of the invention, the band is subjected to a decrease in temperature on the cooling roller of between about 50° C. and 60° C., preferably between 52° C. and 57° C. This decrease in temperature corresponds to the difference between the initial temperature of the band of boiled sugar material during dimensioning, i.e., when the boiled sugar material is applied to the roller, and the final temperature or the temperature when the band of boiled sugar material is deposited over the core. It is important to note that the band is not subjected to any mechanical stress during its controlled decrease in temperature; thus, the emulsive structure of the sugar/fat network remains intact and favorable characteristics of the boiled sugar material are preserved, in particular, the phenomena of moisture transfer towards the core is delayed.

The initial temperature $T_1$ necessary for the boiled sugar to allow its effective passage through the opening, ensuring precise dimensioning of the band on the roller, is between about 75° C. and 95° C., preferably between about 85° C. and 92° C. The initial temperature is chosen so that the mass of boiled sugar material is in a state of low viscosity so that it can be dimensioned by passing through an opening. If the mass is too viscous, because of an excessively low temperature, the band cannot be dimensioned on the roller or at least not to the desired dimensions and the opening may become partially or completely blocked by the boiled sugar material. If the initial temperature is too high, flowing of the band and sagging of the band on the surface of the roller can occur.

The final temperature $T_2$ of the band when it is deposited on the core is between about 25° C. and 40° C., preferably about 32° C. and 37° C. The final temperature of the material is also important because it determines the plastic state of the material. If the band is too hot, it cannot be easily detached from the roller, which can lead to tearing or to extension of the band. On the other hand, if the temperature is too low the band will be excessively hardened and, although it can be easily detached from the roller, will not fold after being deposited on the core and the core will not be properly coated.

Of course the temperature values may vary somewhat depending on the type of boiled sugar used and its formulation, for example, depending on whether it is caramel, marshmallow, nougat, or the like. It should also be noted, however, that the band does not have a uniform temperature over its entire cross section. Rather, a temperature gradient of several degrees is observed between the inner surface of the band in direct contact with the roller and the outer surface of the band not in direct contact with the roller. Temperature re-equilibration within the band, however, is established when the band leaves the surface of the roller. The temperatures given are understood to refer to mean temperatures for a given section in the band.

It has been possible to determine, by appropriate viscosity measurements, that the plastic viscosity of the material based on boiled sugar to provide the desired degree of flexibility and bending is between about 4,000 and 10,000 poises for a shearing rate of between about 2 and 8 second$^{-1}$, and preferably between about 4,500 and 7,600 poises. Since boiled sugar is a viscous product with a non-Newtonian behavior, its viscosity is dependent on the shearing threshold.

Precise control of the temperatures of the band is essentially obtained by precisely adjusting the temperature of the roller and the speed at which the roller advances. Thus, the roller is generally maintained at a constant temperature of the order on about 18° C. to 22° C., preferably about 20° C.±1° C. for a roller advancing at a speed on the order of about 4 to 7 in/min, preferably about 5 to 6 in/min. The roller may be cooled by internally circulating a cooling fluid, such as water or a mixture of water and glycerol. The dimensions of the roller may be variable. Typically, the diameter of the roller is between about 80 cm to 2 m, preferably about 90 cm to 1.5 m, and more preferably about 1 m.

In one embodiment, the roller is rotated in a direction opposite to the direction of travel of the core so that, after detachment of the band, the band forms a loop open on the forward side, i.e., on the side in the direction of travel of the core, so that the surface of band that is in contact with the roller is the surface of the band that contacts the base. This embodiment has the advantage that pieces of inclusions such as cereals, nuts, dried fruit, chocolate chips, sweets, and the like can be deposited on the external surface of the band. Depositing inclusions on the band preferably takes place after the band is applied to the roller and before it is detached from the roller. The relatively pasty state of the band advantageously facilitates adhesion of solid inclusions to the band so that they are retained by the band. As the band continues to travel on the roller, the adhesion of the inclusions is improved by the gradual hardening of the band. Depositing inclusions onto the band while it is on the roller is an aspect of the invention which is itself advantageous relative to traditional process that uses a curtain of boiled sugar. With the process of the invention it makes it possible to more evenly distribute the inclusions over all the surfaces of the product. Indeed, in the traditional process, using a curtain of boiled sugar material, depositing the inclusions is performed after the core is coated with boiled sugar and, therefore, the inclusions adhere less strongly to the vertical sides of the coating compared to the top surface of the coating. Therefore the traditional process leads to an unevenness in the density of inclusions between the top and the sides of the coated product. In contrast, according to the method of the invention, the inclusions are deposited on a flat band which provides a more homogeneous distribution of inclusions.

In one embodiment, the roller is rotated in the same direction as the direction of movement of the core so that the outer surface of the band, i.e., the surface of the band not in direct contact with the surface of the roller, becomes the surface in contact with the core. An advantage of this embodiment is that adhesion of the band to the base is promoted because the outer surface of the band is, in general, a few degrees hotter than the surface in direct contact with the roller. It is therefore possible to take advantage of this temperature variation or gradient in the band to promote adhesion of the band to the core.

In another embodiment of the method of the invention, several continuous bands, arranged parallel to each other on the roller, are applied to the roller. In this embodiment a reservoir is available that contains the molten mass of boiled sugar material which is to be placed on the roller. The reservoir comprises a dimensioning comb provided with a series of several openings that allow a series of several continuous parallel bands to be dimensioned onto the roller for coating a series of several cores that are parallel to the bands. The cores are continuously passed under the bands on a conveying means placed below the roller. The series of several cores may be obtained by cutting a sheet of large width into portions and laterally separating the portions with a separator to provide cores with a defined lateral separation that is greater than the width of the bands that will be deposited on the cores.

In another embodiment of the invention the boiled sugar coating is successively deposited on the core by having at least two rollers arranged in series. The first roller deposits a first band having a first thicken over the core, and then at least a second roller deposits a second band having a second thickness over the first band. Such an arrangement has the advantage of being able to provide a wide range of dimensions for the coating both in terms of thickness and in terms of width. In particular, it is possible with this embodiment to produce a product having a thick coating, for example, on the order of about 5 to 7 mm. It is also possible to vary the thickness in some parts of the structure by depositing different band widths. It is also possible to coat the core with several materials whose nature and/or characteristics are different, such as, for example, depositing a first layer of caramel followed by a second layer consisting of nougat, or conversely.

Any boiled sugar confectionery coating can be used with the method of the invention. Preferably, the layer of boiled sugar confectionery material used to form the coating is chosen from preparations based on caramel, chewy paste, marshmallow, nougat, and mixtures thereof. The formulation generally comprises an emulsion consisting of sugar, water, fat, and optionally proteins, and is cooked at temperature of between about 120° C. and 130° C. One of ordinary skill in the art would readily know how to make a boiled sugar confectionery for use in the method of the invention without undue experimentation.

The core of the bar is preferably a wafer or a stack of several layers of wafers having intermediate coatings of filling cream, such as a praline. The core, however, may be a biscuit core; an ice cream core; a hardened boiled sugar core, such as a nougat; or any combination thereof.

The resulting bars that are coated with boiled sugar confectionery, after being cut into portions, may be further coated, completely or partially, with chocolate.

The invention further relates to a device for manufacturing confectionery bars comprising a three dimensional core that is at least partially coated with a layer of confectionery material based on boiled sugar. The device comprises a conveying means for passing a continuous line of core material to be coated; at least one roller situated above the conveying means comprising a cylindrical surface; a heated reservoir for receiving the confectionery material based on boiled sugar in a form which can be spread over the surface of the roller; wherein the reservoir comprises an outlet to allow the boiled sugar confectionery material to be dimensioned into at least one band on the roller. The outlet is limited both in the direction parallel to the surface of the roller so as to dimension the band in thickness and in the vertical distance from the roller so as to dimension the band in width, in order to form a band on the surface of the roller having proper dimensions so that it can be applied to the continuous line of core material to be coated.

A first embodiment of the device 10 for carrying out the process of the invention is shown in FIG. 1. The device includes a conveying device 20, such as conveyor belt, arranged horizontally for conveying a series of wafers 30, 31, 32 of individual length $L_1$. The wafers are arranged end to end on the conveyor belt so as to define a continuous line of core material 3 to be coated. The continuous line of core material 3 therefore moves in a direction of horizontal movement I. Above the conveying device, there is arranged a coating device comprising a cooling roller 4 having a cylindrical surface 40. The cylindrical surface is preferably a smooth surface. The roller is mounted on an axis of rotation 0 substantially transverse to the direction of movement I of the wafer base. A reservoir 5 for receiving a molten boiled sugar confectionery material 8, such as caramel, is mounted in an upper part of the roller 4. Heating means are preferably attached to the reservoir in order to maintain the mass in a liquid or semi-liquid state at a constant temperature, preferably on the order of about 85° C. to 95° C. The reservoir is open at the bottom such that the confectionery mass contained in the reservoir is capable of entering into permanent contact with the roller by gravity.

Figure 2:
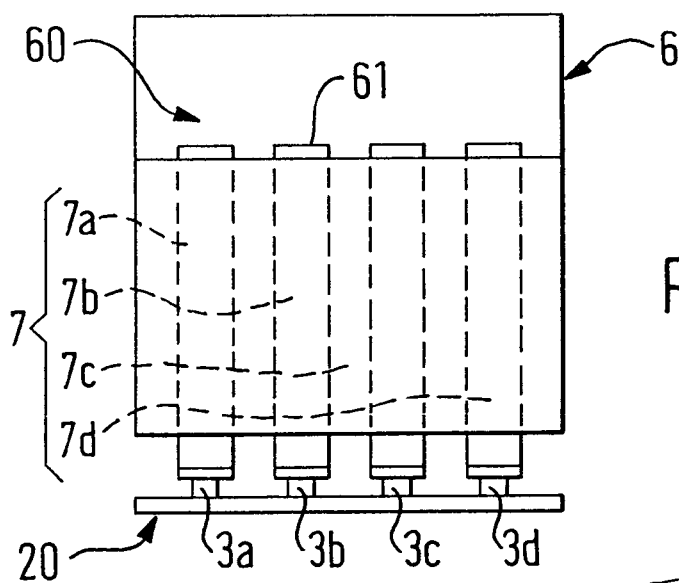
FIG. 2 depicts a front view of a partial section of the device of FIG. 1 along A—A.

As shown in FIG. 2, the reservoir possesses a calibrating means 60 forming a comb for dimensioning, in parallel, a series 7 of confectionery bands 7a, 7b, 7c, 7d. The bands are arranged vertically above a corresponding series of several core bases 3a, 3b, 3c, 3d which pass continuously on the conveying means 20. The dimensioning means 60 is composed of a series of parallel openings 61 made in the wall of the reservoir. The number of openings corresponds to the number of bands to be deposited on the roller. Each opening 61 is individually dimensioned in width L and in thickness e so as to form an individual band having the desired dimensions. A micrometric system of adjusting the thickness and/or the width, which can be individually controlled for each opening, may advantageously be introduced in order to make it possible to refine the dimensions of each of the bands, in particular to compensate for temperature variations in the reservoir (this system itself is not represented).

Each band 7 is dimensioned by passing through the opening 61 and is deposited on the rotating roller. The rotating roller cools the bottom-most layer of the confectionery mass 8 so that it adheres by viscosity to the surface of the roller. During its angular passage over the roller, the confectionery band gradually cools and its viscosity increases proportionally, resulting in the formation of a band having some strength. When the band reaches a bottom point of the roller it is detached by means of a scraper 80 arranged tangentially to the roller. The temperature of the roller, as well as the speed of rotation of the roller, are parameters regulated according to the specific properties of the mass to be cooled and the viscoplastic state that is desired for the mass so that the resulting band has the capacity to bend when it is applied to the core. The angular arrangement of the reservoir also depends on these desired final properties of the band. In general, the reservoir is arranged such that the band travels through an angular range of between about 180 and 270 degrees, preferably between about 190 and 220 degrees.

In some cases, the band is capable of becoming detached from the roller by itself, without using a scraper, by allowing the band to contact the core and to adhere to the core so that the band is pulled off of the roller. Excessive pulling, however, is undesirable since it can result in an undesirable extension or distortion of the band. Thus, it is preferable that the speed of rotation of the roller be substantially the same as the speed of passage of the core 3 on the conveying means.

Figure 3:
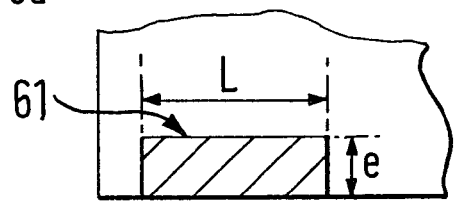
FIG. 3 depicts a detailed view of a partial section of FIG. 2 along A—A.

Provision can also be made for depositing inclusions such as cereals, for example, puffed rice; nuts; dried fruit; sweets; chocolate chips; and the like, from a hopper 9 placed substantially vertically over the center of the roller downstream from the opening 61 that discharges and dimensions the boiled sugar material onto the roller. Thus, inclusions and the like are supplied by gravity onto the band of confectionery mass at a stage where the band has a high capacity for adhering to particles of low mass. Adhesion of the inclusions to the band is assured since the viscosity of the band gradual increases. As shown in FIG. 3, the band after reaching a satisfactory viscoplastic state on the roller, is deposited on the top of the core 3 in a horizontal deposition plane P that is parallel to the surface of the conveyor 20. In the illustrated case, where the core is a wafer, having a substantially rectangular section, the plane of deposition corresponds to the top surface 34 of the wafer.

It should be noted that, between the line of detachment from the roller and the line of deposition on the wafer, the band forms a loop 72, which is open in the direction of advance I, such that the external surface 70 of the band, i.e., the surface of the band not in contact with the roller, carrying the cereal or other inclusions 90 constitutes the external face of the coating on the wafer, i.e., the surface of the band not in contact with the core, and the surface of band in contact with the roller 71 becomes the internal face for adhesion to the wafer, i.e., the surface of the band in contact with the core. The height $H_1$ between the line of detachment and the conveyor belt may be optimized so that the band reaches the desired viscoplastic state before contacting the most elevated surface or point of the core, to allow for the band to fold, when the band is deposited on the wafer. For this purpose, trials have shown that the height $H_1$ should be about 4 to 15 cm, preferably about 5 to 8 cm.

Figure 4:
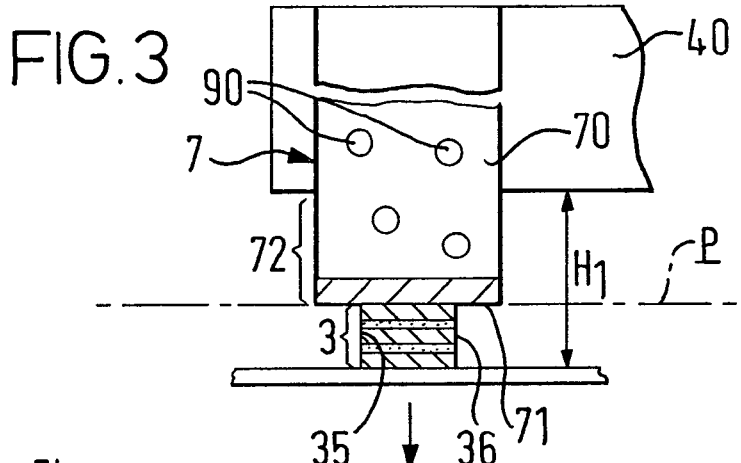
FIG. 4 depicts a detailed view along B—B showing folding of the band.
Figure 4:
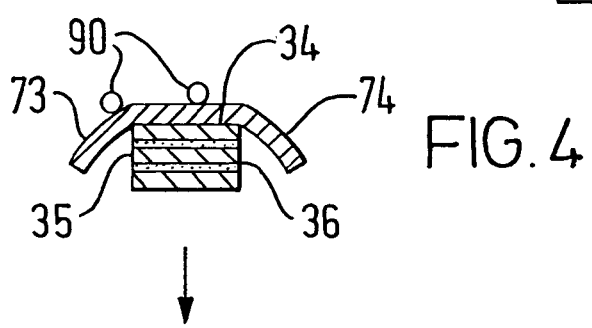
Figure 5:
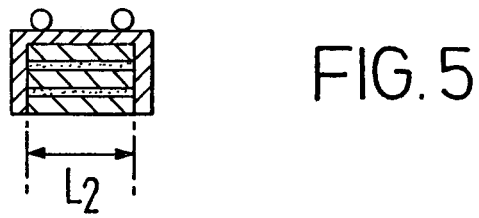
FIG. 5 depicts a detail view along C—C after folding of the band.

Preferably, the band projects beyond the each side edge of the top surface of the core, i.e., the band is wider than the width of the core, at the time the band is deposited on the core. Preferably, the width L of the band substantially corresponds to the dimensions of the top surface 34, and of the side surfaces 35, 36 of the core so that the band can fully and exactly cover the visible parts of the core. FIG. 4 shows the intermediate stage during which the free parts 73, 74 of the band sag by the effect of their own weight, and FIG. 5 shows the covering of the band after complete folding and adhesion of the free parts 73, 74 to the core. The expression "free parts," as used herein, is understood to mean the band portions which are distant from the surfaces of the core to be coated at the time the band is brought into contact with the core. In this case, wherein the core is a wafer with a rectangular section, the free parts constitute the lateral faces of the coating that are intended to cover the sides of the wafer. According to an important aspect of the invention, at the time the band is deposited along the defined plane P, the band should be in a non-solidified, supple, and plastic state so that the band has a capacity for folding from the plane P through an angle of deformation greater than about 20 degrees, preferably about 45 to 90 degrees. Thus, it is possible to quantify the deformation of the band by measuring the angle formed by the free parts of the band when they fold, from a horizontal reference corresponding to the plane of deposition. In the case where the band has a folding capacity of less than about 20 degrees, because of an excessively high stiffness resulting from advanced hardening or by being too thick, it is then more difficult to cover a confectionery surface with the method of the invention. It is also important for the band to be such that it can be folded without undergoing creep or extension which would modify its initial dimensions in a manner that is difficult to control. A slight creep, however, is acceptable to the extent that it does not visually appear as a defect in the coated product. It is also important to note that the band should retain a capacity to adhere to the surfaces of the core to be coated. Therefore, the surface of the band that contacts the core should preferably retain a relatively pasty and not completely solidified quality while still maintaining sufficient strength so that the band can be separated from the roller by scraping means.

As shown in FIG. 1, the solidification of the continuous band of confectionery mass once folded and stuck to the core continues along the conveyor until the coated core is cut into individual bar portions by an appropriate cutting means 81 such as a mechanical cutting system or by ultrasound. The resulting coated bars may be further coated with a chocolate layer. The bars may be coated with chocolate by any means available to those of ordinary skill in the art including, but not limited to, immersing the bars in a molten chocolate mass or spraying molten chocolate on the bars (this step is not represented).

Figure 6:
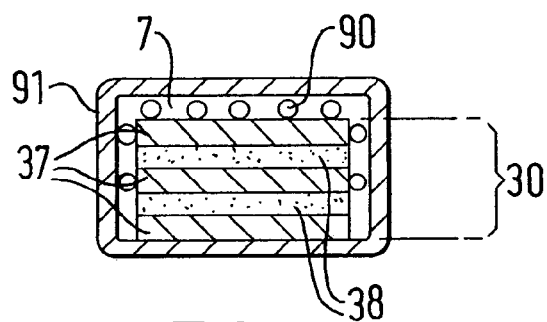
FIG. 6 depicts a sectional view of a finished coated confectionery bar.

FIG. 6 shows the final confectionery product ready for packaging after coating with an external layer of chocolate. The core of the product itself comprises a succession of layers of waffle 37 and of layers 38 of filling cream. The boiled sugar coating 7 covers the top and side faces of the core and comprises inclusions 90. Finally, an external layer of chocolate 91 constitutes the final coating.

Generally, the core is rectangular and the band will cover the top surface of the core and extend partially or fully on one or both sides. When a plurality of cores arranged end to end to each other pass beneath the roller, the band can be applied to the front and rear sides as well, again either partially or fully depending upon the width of the band, the free portions of the band, the width of the cores and the spacing between the cores. When the core has a point or convex surface, the band can be applied to the point or highest location on the convex surface and the partially or fully on one or both surfaces adjacent the point or highest location, again depending upon the width of the core and the width of the band and the width of its free portions. One of ordinary skill in the art can easily determine optimum ways for the extent of the band coating coverage upon the cores depending upon the features desired in the final confectionery product.

Figure 9:
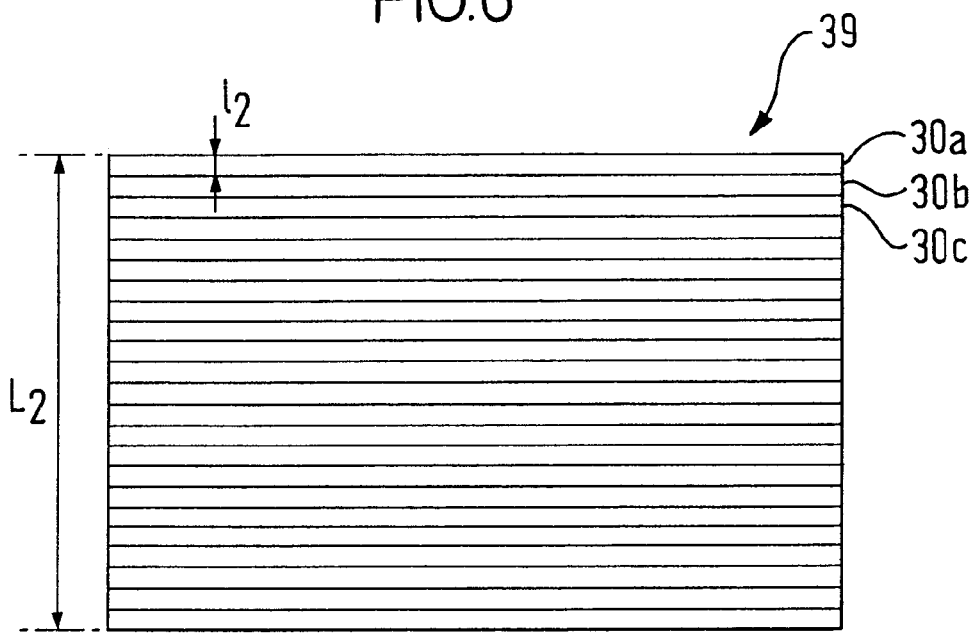
FIG. 9 depicts a top view of a waffle sheet after cutting.
Figure 10:
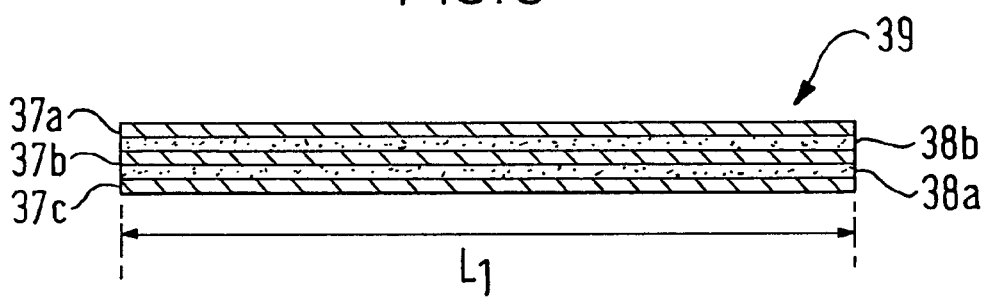
FIG. 10 depicts a side view of the waffle sheet of FIG. 9.
Figure 7:
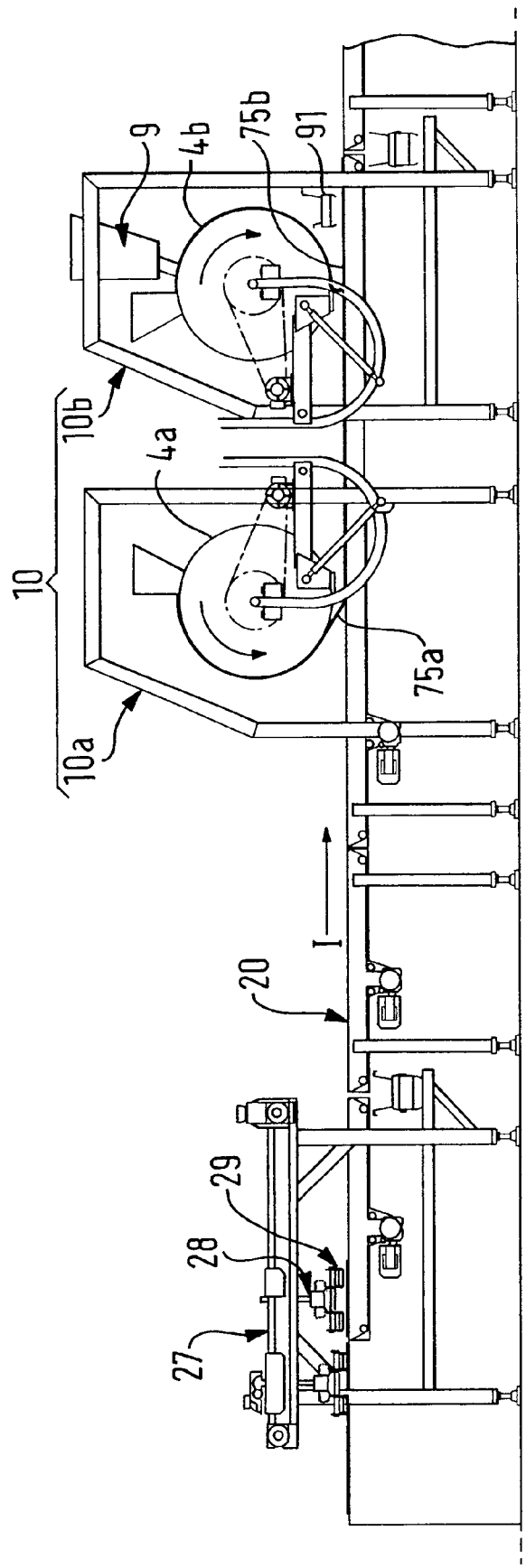
FIG. 7 depicts a side view of a device for carrying out the method of the invention.
Figure 8:
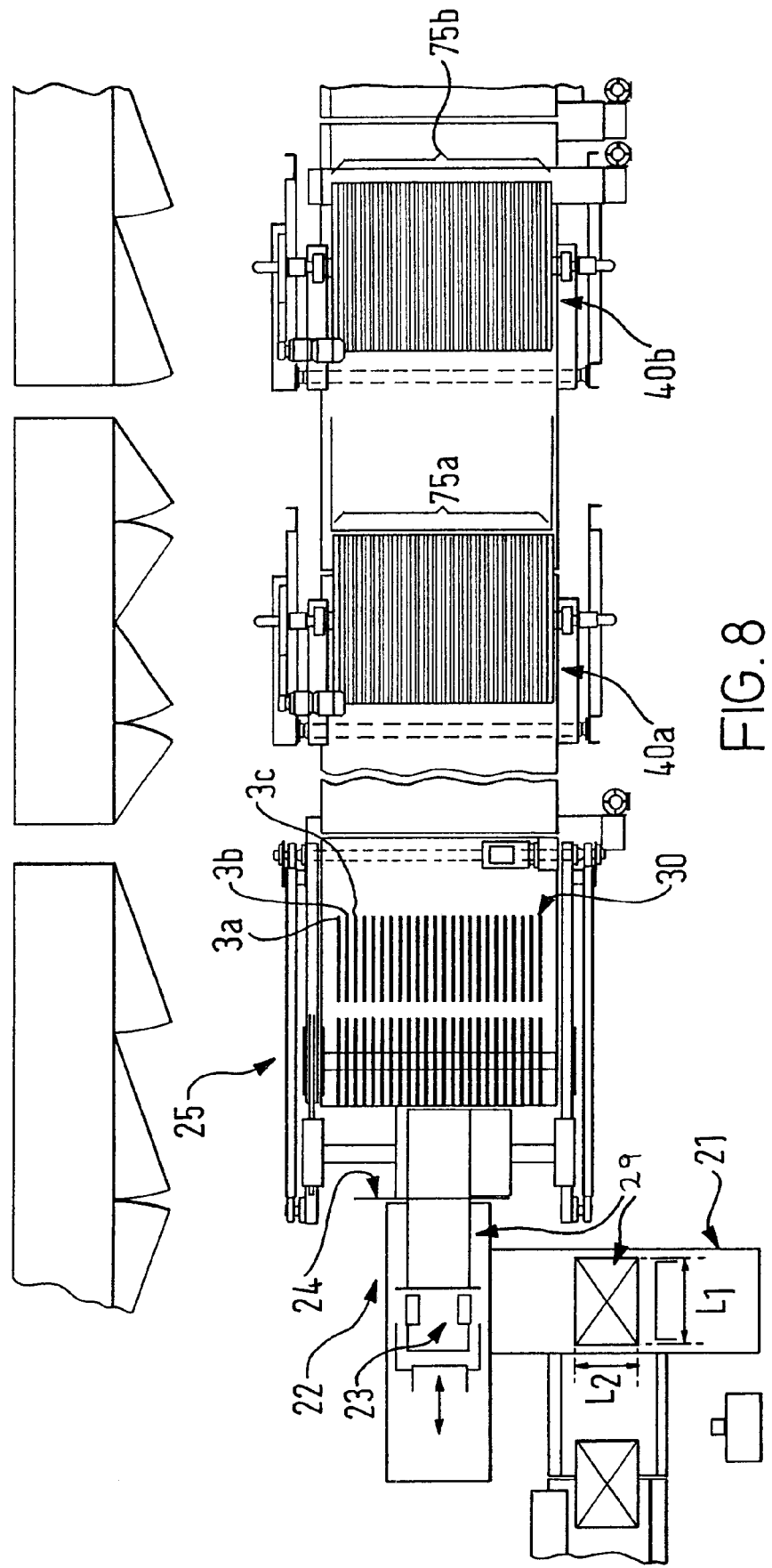
FIG. 8 depicts a top view of the device of FIG. 7.

FIGS. 7 and 8 show the arrangement of a device according to one embodiment of the invention. Wafers are obtained from waffle sheets 29 as illustrated in FIGS. 9 and 10. The waffle sheets 29 have a length $L_1$ and a width $L_2$ designed to allow the width wide coating of a plurality of individual wafers 3a, 3b, 3c, and the like. The width $L_2$ is a multiple of the width 12 of each of the individual wafer such that it is possible to coat a defined number of wafers in the sheet. For example, FIG. 9 depicts 23 individual wafers of width 12 and length $L_1$. Each waffle sheet 29 advantageously comprises a sandwich structure comprising a super-position of waffle layers 37a, 37b, 37c with a layer of filling cream 38a, 38b placed between each waffle layer. The filling layer may, for example, be a praline-flavored cream or the like.

The waffle sheets 29 are obtained by spreading a filling cream over a waffle layer, placing a new waffle layer on top and then pressing the waffle layers together and so on until the desired number of waffle layers is obtained.

Each whole waffle sheet 29 is transported on a conveyor belt 21 up to a cutting station 22. The waffle sheet is fitted between a pushing means 23 and a cutting means 24. The pushing means is driven in a back and forth longitudinal movement which causes the waffle sheet 29 to pass through the cutting means which consists of a cutting grid provided with a series of vertically oriented cutting blades or wires. The wafers 30, as cut from the sheet, are then separated individually on a sliding plate to provide a lateral separation by a separating device, such as with a needle separating station 25. The needle separating station is provided in the form of a transporting device 27 overhanging the cut waffle sheet and comprises a separating slide 28 which can be moved along the transporting device 27 and is equipped with needles 29 which separate the wafers. The support-mounted needles are driven in a vertical back and forth movement to insert the needles into each sheet in the separating station. Of course, the distance separating the wafers is determined according to the position of the bands on the roller, the width of the bands, and the relative distance separating the bands. A lateral separation between each wafer on the order of about 1 to 5 cm is preferable and makes it possible to have a high processing capacity while still limiting the size of the device.

The wafers 30, positioned with their lateral separation, are transported on a conveying means 20 in the direction of the actual coating line 10. For this purpose, a continuous lines of wafers, arranged in an end to end manner along the direction of movement of the conveyor are prepared, as explained above in the example of FIG. 1. The coating line comprises two coating stations 10a, 10b that are separated longitudinally along the conveyor belt. The two coating stations 10a, 10b comprise a series of two rollers 4a, 4b mounted in series. The first roller 4a is rotated in the direction of passage I of the conveying means so as to deposit on the wafers a series 75a of parallel bands of boiled sugar confectionery material such that the outer surface of the bands, i.e., the surface of the band not in contact with the roller, becomes adhered to the surface of the wafers. This surface of the band is slightly hotter than the surface of the band that is in contact with the roller so that adhering of these first bands to the wafers is favored.

The second coating station 10b is mounted with a roller 4b rotated in the direction opposite to the direction of passage I of the conveying means. Therefore, it is possible to place on the top part of the roller a depositor 9 for depositing inclusions such as cereals, nuts, dried fruit, sweets, chocolate chips, and the like onto the bands. The depositor is typically a hopper with an adjustable opening directed over the roller and linked to a vibrator. A recovering system 91 is placed horizontally and vertically beneath the vertical tangent to the surface of the roller to recover any inclusion which might become detached from the bands.

The arrangement of two coating stations in series allows for a wide choice of coating thicknesses to be obtained. The coating thickness may range from about 1 mm when a single station is used to about 7 to 8 mm when two stations are used. Above a thickness of about 3.5 to 4 mm per band, an increased stiffness is observed which leads to a folding capacity that is insufficient to obtain correct coating and adhering of the bands to the core. The maximum thickness per band, however, may vary according to the nature of the coating materials, the temperature conditions, and parameters of the device.

Figure 11:
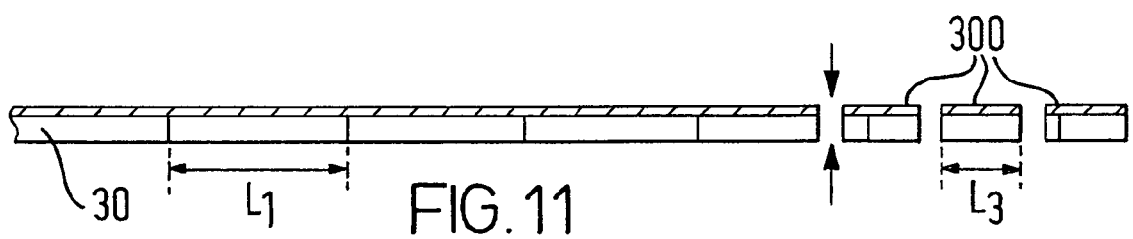
FIG. 11 depicts cutting a base formed by a succession of coated wafers to form bars.

The operation which follows the coating of the wafers consists of cutting portions 300 of desired length with a cutting means as shown in FIG. 11. The length $L_3$ of the portions may be independent of, and is generally less than, the length $L_1$ of the end-to-end portions 30 of the wafers just after coating. Coating with a boiled sugar confectionery material has the advantage of integrally attaching the portions 30 to each other so as to form a continuous coated base which can be easily cut at any desired site.

It is understood that the coating of the core may be complemented by depositing a lower layer of boiled sugar in contact with the lower surface of the core (not represented). For this it is possible to deposit, using an additional roller, a flat dimensioned layer of boiled sugar over the conveyor belt. The band is dimensioned in the desired manner in terms of thickness and width. The waffle is then tangentially applied to the flat layer of boiled sugar, which has not yet completely hardened, so that it adheres to the bottom layer of the waffle. The operations for coating the other surfaces of the core are then carried out as described in the preceding examples.

Figure 12:
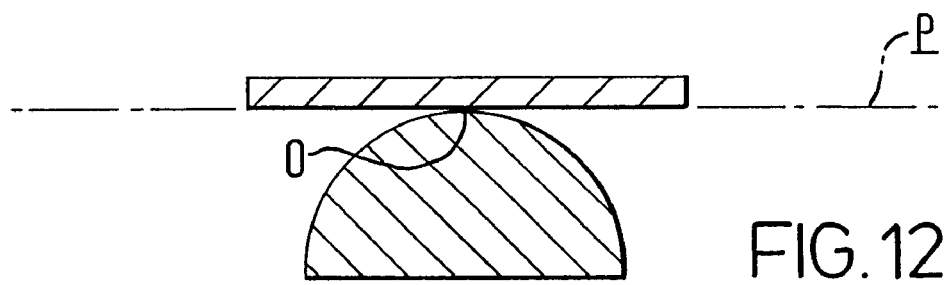
FIG. 12 depicts a core having a semi-cylindrical shape that is to be coated.
Figure 13:
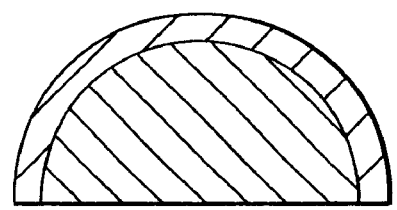
FIG. 13 depicts the coated product of FIG. 12.
Figure 14:
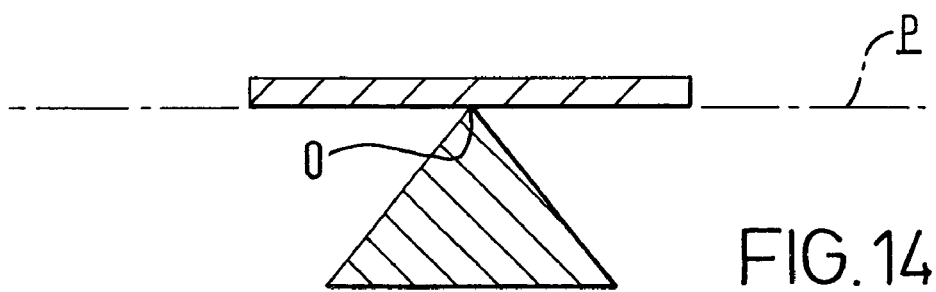
FIG. 14 depicts a core having a triangular shape that is to be coated.
Figure 15:
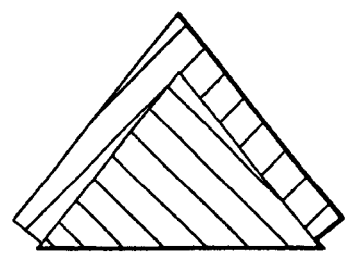
FIG. 15 depicts the coated product of FIG. 14.

FIGS. 12 to 15 illustrate various possible forms of coated bars according to the invention. FIGS. 12 and 13 show the arrangement of a confectionery band by viscoplastic folding over a core of hemispherical transverse section. In this case, the band is applied on a plane of deposition P adjacent to the most elevated line, i.e., the tangent to the curve 0 of the core. FIGS. 14 and 15 show the arrangement of a band over a core of triangular transverse section.

Of course, other forms of the three dimensional core are possible such as a square or trapezoidal shape, for example. In all cases, the core to be coated possesses a surface to be coated in three dimensions and the deposition is carried out along the most elevated line or surface of the base before the free parts of the band fold themselves down over the edges of the core, taking advantage of the folding capacity of the boiled sugar material.

It is observed that by operating according to the above-described method, a coating of surprisingly uniform thickness is obtained over all the surfaces of the core that are covered. Until now such uniformity could not be obtained by traditional processes, especially in the relevant thickness ranges. Such a uniformity provides a product of better quality with a more homogeneous texture and consistency. A better distribution of the solid inclusions embedded in the confectionery is also possible with the method of the invention. The method of the invention also significantly reduces the proportion of boiled sugar material that needs to be recycled.

EXAMPLES

Various examples of boiled sugar mass which may be suitable for the coating are given in the following examples.

Example 1

A mint-flavored confectionery mass of the chewy paste type is produced in the following manner: 12 kg of frappe are prepared from 50% by weight of egg albumin and 50% by weight of water. A sweetened mass is prepared by combining 100 kg of glucose syrup, 100 kg of sugar, and 12 kg of fat and heating to a cooking temperature of 126° C. The frappe is then added to the sweetened mass at the cooking temperature and mixed. A reservoir is filled with the mixture of frappe and sweetened mass and the mixture is maintained at a temperature of about 90° for dimensioning onto a roller.

Example 2

A caramel mass is produced in the following manner: 5 kg of 140 bloom gelatin is prepared by immersing 50% by weight of gelatin in 50% by weight of water. Also prepared is a sugar mass by combining 100 kg glucose syrup, 60 kg sugar, and 15 kg of fat and heating to 129° C. The 140 bloom gelatin is then mixed with the sugar mass. A reservoir is filled with the mixture of gelatin and sugar mass and the mixture is maintained at a temperature of about 90° C. for dimensioning onto a roller.

Example 3 and 4

The ingredients for a marshmallow mass and a nougat mass are the following table:

|  | Ingredients | Marshmallow (kg) | Nougat (kg) |
| --- | --- | --- | --- |
| Portion 1 | Sugar | 20 | 16 |
|  | Water | 7 | 5 |
|  | Glucose | 26 | 14.5 |
| Portion 2 | Milk protein or albumin | 0.150 | 0.120 |
|  | Water | 0.225 | 0.180 |
|  | Glucose syrup | 0.625 | 0.450 |
| Portion 3 | Skimmed milk | — | 0 |
|  | Icing sugar | — | 0.75 |
|  | Fat | 3 | 2 |

Example 3

The marshmallow mass is obtained by cooking portion 1 at 123° C. in order to obtain a syrup, adding portion 1 to portion 2, and whipping the combined portions in a high-speed planetary beater. Portion 3 is then added at low speed and the resulting mixture transferred to a reservoir.

Example 4

The nougat mass is obtained by cooking portion 1 at 120° C. until a syrup is obtained, combining portion 1 and portion 2, and whipping the combined portions in a high-speed planetary beater. Portion 3 is then added at low speed and the resulting mixture is transferred to a reservoir.

Example 5

A caramel of the type in Example 2 is subjected to a viscosity measurements at a temperature of 35° C. which corresponds to the average temperature for depositing the caramel on a wafer, and a variety of shear rates. The following results were obtained:

| Shearing rate (second$^{-1}$) | Viscosity (poise) |
| --- | --- |
| 2 | 7,562 |
| 4 | 6,121 |
| 6 | 5,291 |
| 8 | 4,625 |

What is claimed is:

1. A method for manufacturing coated confectionery bars in the form of a three dimensional core which is at least partially coated with at least one layer of a boiled sugar confectionery material comprising:

providing a heated, continuous band of a boiled sugar confectionery material at a depositing temperature sufficient to enable the band to bend under its own weight, the band having a thickness, a width, and first and second surfaces; and depositing the band on one or more three dimensional cores each having a length, a width, at least two sides, and a top surface or point, with the band being deposited in a plane that is adjacent to and in contact with the surface or point of the one or more cores so that the band bends under its own weight to at least partially cover the top surface or point and at least one side of the one or more cores to provide at least one three dimensional coated confectionery bar.

2. The method of claim 1, wherein the three dimensional core is in the shape of a square, rectangular, triangular, trapezoid, or hemispherical section and the band of boiled sugar confectionery material has a viscosity of about 4,000 poise to 10,000 poise at a shearing rate of about 2 to 8 seconds$^{-1}$ when being deposited.

3. The method of claim 1, wherein in boiled sugar confectionery material comprises one or more of caramel, chewy paste, marshmallow, or nougat and the core comprises a wafer, a biscuit, ice cream, or a hardened boiled sugar base.

4. The method of claim 1, wherein the first surface has a temperature that is greater than that of the second surface to provide greater stickiness for the first surface and depositing the band with the first surface directly contacting the core(s).

5. The method of claim 1, which further comprises providing inclusions on the first surface of the band and then depositing the band with the second surface directly contacting the core(s).

6. The method of claim 5, wherein the inclusions comprise cereals, nuts, dried fruit, or mixtures thereof.

7. The method of claim 1, further comprising cutting the three dimensional coated confectionery bar followed by at least partially coating the cut bar with chocolate.

8. The method of claim 1, which further comprises providing a plurality of bands and a plurality of cores, each core having a length, a width, at least two sides, and a top surface or point, wherein each band bends under its own weight without a substantial change in the thickness or width of the band to at least partially cover the top surface or point and at least one side of each of the cores in order to provide a plurality of three dimensional coated confectionery bars.

9. The method of claim 8, wherein each band has a thickness of from about 3.5 to 4 mm, the bands are spaced laterally and the plurality of cores are oriented laterally and end to end lengthwise.

10. The method of claim 8, which further comprises supporting each band before depositing them upon the cores.

11. The method of claim 10, wherein each band is formed on the support by first heating a boiled sugar confectionery material to a first temperature that is greater than that of the depositing temperature and then passing the heated confectionery material onto the support for cooling to the depositing temperature prior to depositing the bands upon the cores.

12. The method of claim 10, wherein the depositing temperature is about 50° C. to 60° C. less than the first temperature, with the first temperature being between about 75° C. and 95° C. and the depositing temperature being between about 25° C. and 40° C.

13. A method for manufacturing coated confectionery bars in the form of a three dimensional cores which are at least partly coated with at least one layer of a boiled sugar confectionery material comprising:

providing a plurality of heated, continuous bands of boiled sugar confectionery material at a first temperature, wherein the bands have a thickness, a width, and inner and outer surfaces;

cooling the bands to a second temperature by placing them on a roller having a cylindrical surface rotating at a first speed, with the inner surface of each band being in direct contact with the cylindrical surface of the roller, and the outer surface of each band not in direct contact with the cylindrical surface of the roller, with the second temperature being sufficient to allow the cooled bands to be detached from the surface of the roller and bend under their own weight;

detaching the cooled bands from the cylindrical surface of the roller; and depositing each band on one or more three dimensional cores which pass by the roller on a conveyor at a second speed, wherein each core has a length, a width, at least two sides and a top surface or point that is most distant from the conveyor, wherein the bands are deposited in a plane that is adjacent to the top surface or point of the cores so that each band contacts the top surface or point of the cores and bends under their own weight to at least partially cover the top surface or point and at least one side of the cores to provide the three dimensional coated bars.

14. The method of claim 13, wherein each band is formed on the roller by first heating a boiled sugar confectionery material to the first temperature and then passing the heated confectionery material onto the roller, wherein the bands are cooled by cooling the cylindrical surface of the roller to a temperature of about 18° C. to 22° C.

15. The method of claim 13, wherein each band has a thickness of from about 3.5 to 4 mm, and which further comprises spacing the bands laterally on the roller, and orienting the plurality of cores laterally and end to end lengthwise on a conveyor that passes beneath the roller, with the first speed and the second speed being substantially the same.

16. The method of claim 13, which further comprises arranging the plurality of cores parallel to each other on the conveyor and the plurality of bands parallel to each other on the roller, wherein each band has a midline running lengthwise along the band and bisecting the width of the band and the midline of each band is separated by a distance, wherein the cores are obtained by cutting a sheet into a plurality of cores with the core width, wherein each core has a midline running lengthwise along the core and bisecting the core width, and laterally separating the cores with a separator so that the distance between the midline of the cores is substantially the same as the distance between the midline of the bands.

17. The method of claim 13, further comprising depositing inclusions onto the outer surface of each band after each band is formed on the cylindrical surface of the roller and before the band is detached from the cylindrical surface of the roller, with the inner surface of each band being deposited onto the core(s).

18. The method of claim 13, which further comprises:

providing a second plurality of heated, continuous bands of a second boiled sugar confectionery material at a third temperature, wherein the bands have a thickness, a width, and inner and outer surfaces;

cooling the second bands to a fourth temperature by placing them on a second roller having a cylindrical surface rotating at a second speed, with the inner surface of each band being in direct contact with the cylindrical surface of the second roller, and the outer surface of each band not in direct contact with the cylindrical surface of the second roller, with the fourth temperature being sufficient to allow the second cooled bands to be detached from the surface of the second roller and bend under their own weight;

detaching the second cooled bands from the cylindrical surface of the second roller; and depositing each second band on the three dimensional coated bars which pass by the second roller on the conveyor at the second speed, wherein the bands are deposited in a plane that is adjacent to the top surface or point of the coated bars so that each band contacts the top surface or point of the coated bars and bends under their own weight to at least partially cover the top surface or point and at least one side of the coated bars.

* * * * *